Patented Apr. 6, 1943

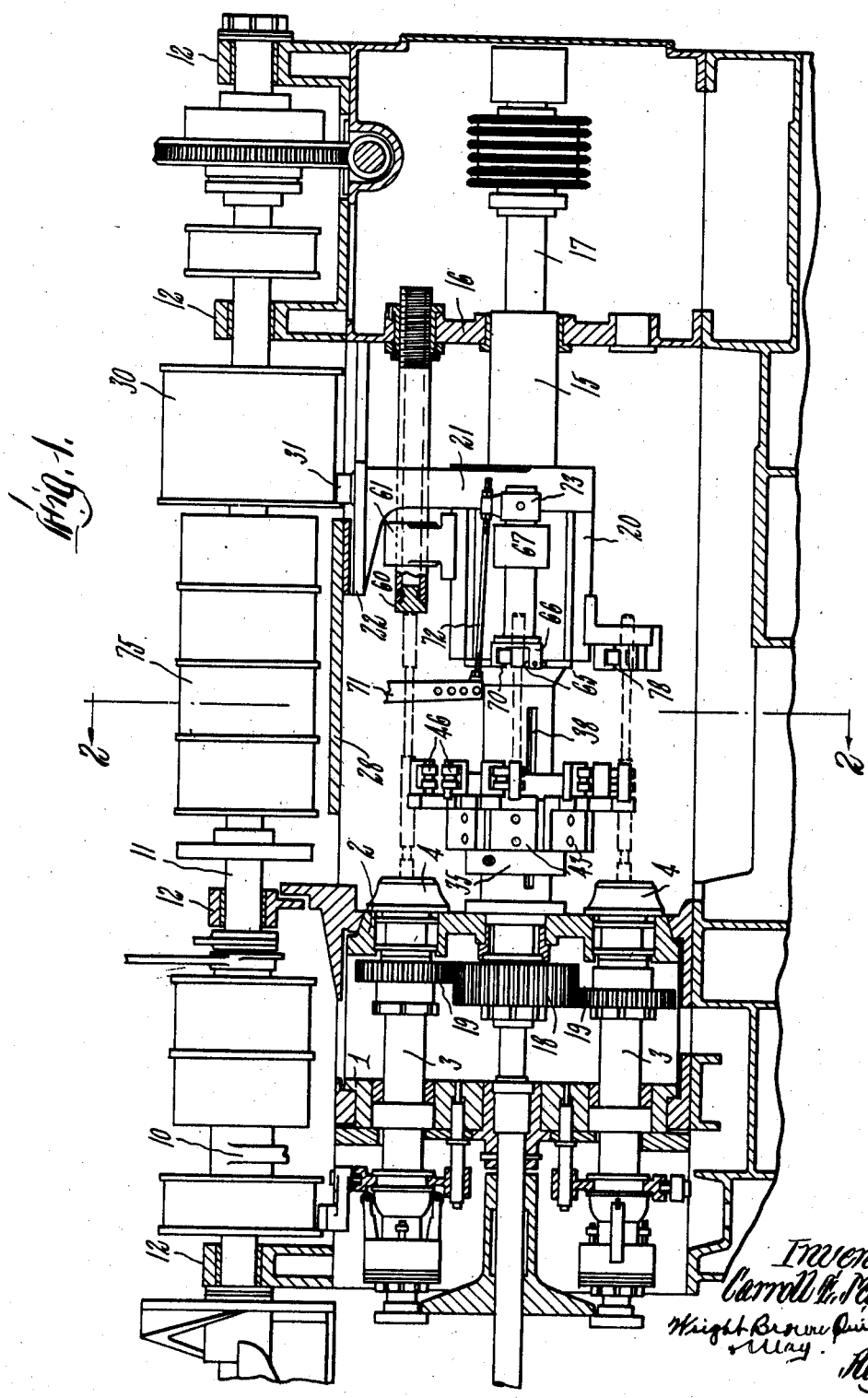

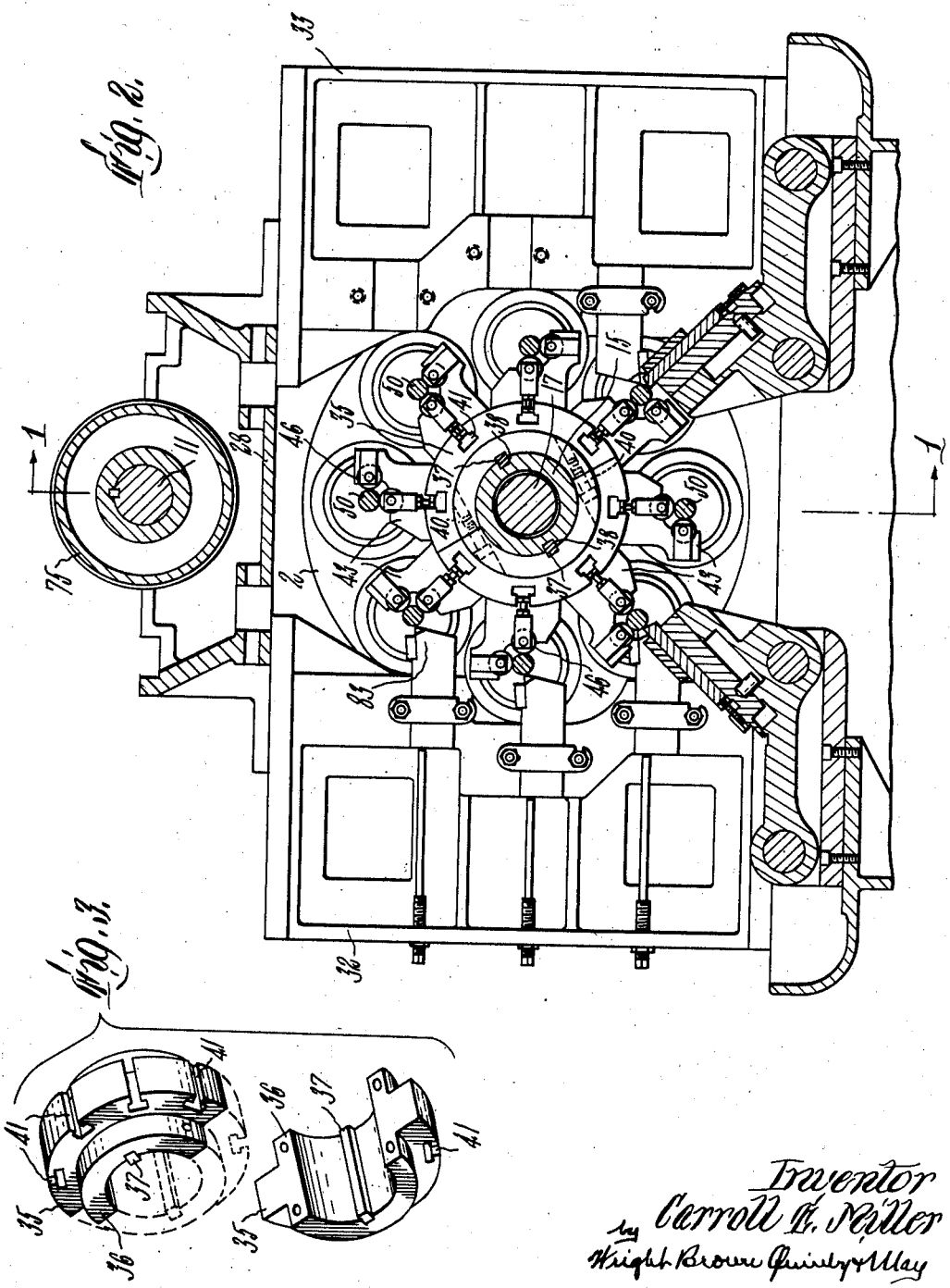

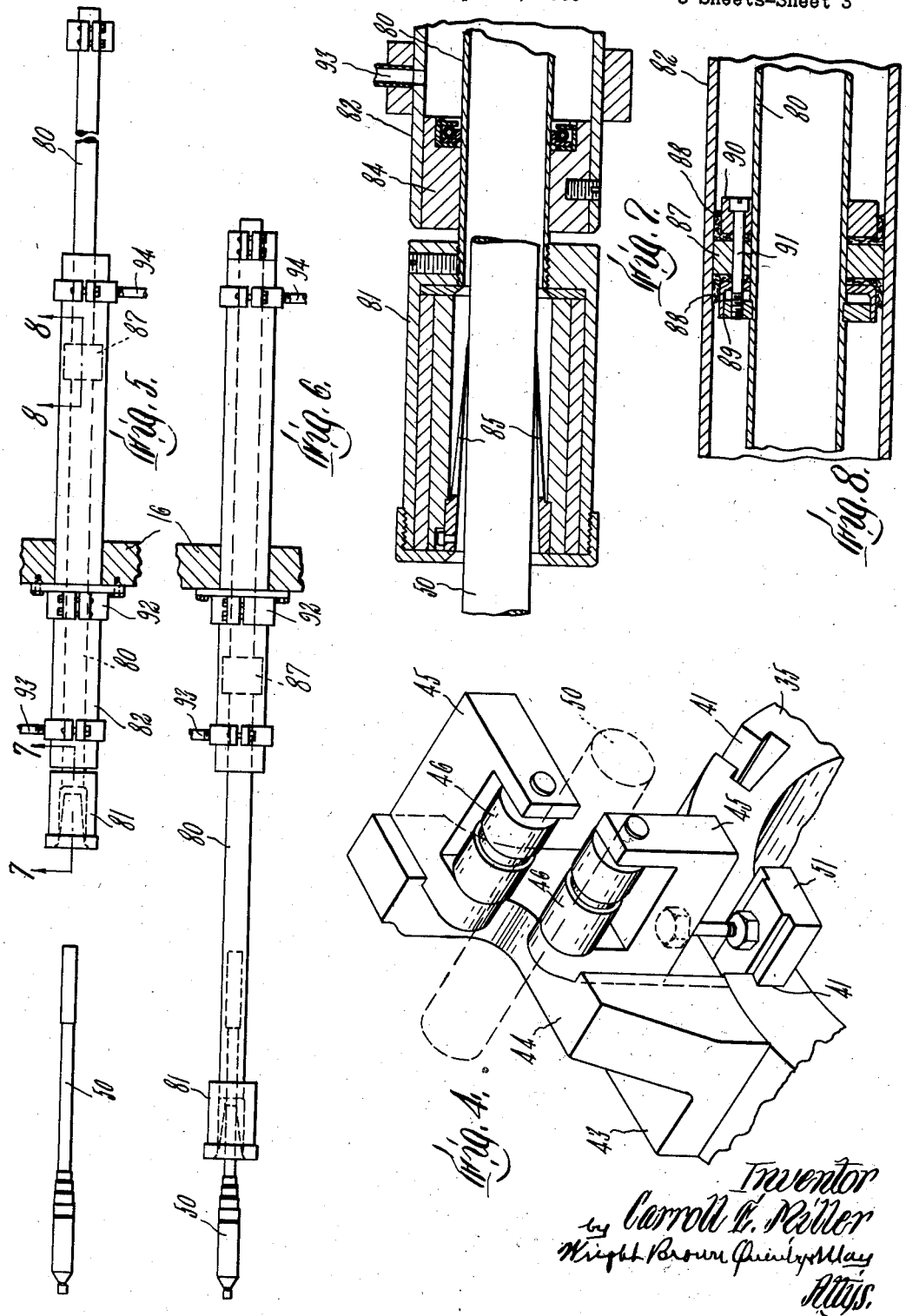

2,316,010

UNITED STATES PATENT OFFICE 2,316,010

STOCK HANDLING MECHANISM FOR AUTOMATIC LATHES

Carroll E. Miller, Windsor, Vt., assignor to Cone Automatic Machine Company Inc., Windsor, Vt., a corporation of Vermont Application September 9, 1939, Serial No. 294,140

8 Claims. (Cl. 29—37)

This invention relates to the handling of stock and articles formed therefrom in an automatic lathe, and more particularly where the articles are long relative to their diameters. With such long articles there is considerable overhang of the stock where tooling is effected beyond the chuck in which the stock is supported, and particularly where the machining operations are done in a plurality of stations, the matter of properly supporting the work during the machining operations and the removal of the machined blanks or articles from the machines is of considerable importance.

In accordance with this invention, therefore, means are provided for supporting the overhanging work at the various spindles of the machine, and means for supporting and conducting the completed blank or work piece away from the machine.

For an understanding of the invention, reference may be had to the accompanying drawings in which:

Figure 1 is a view partly in side elevation and partly in section on line 1—1 of Figure 2 of a multiple spindle automatic lathe embodying the invention.

Figure 2 is a vertical section on line 2—2 of Figure 1.

Figure 3 is an exploded perspective view of the stock support holder.

Figure 4 is a perspective view of a stock support.

Figures 5 and 6 are detail views partly in elevation and partly in section showing work unloading mechanism in different positions.

Figures 7 and 8 are detail sections to a larger scale on lines 7—7 and 8—8, respectively, of Figure 5.

Referring to Figure 1 of the drawings, the multiple spindle lathe shown is of the general type illustrated in my Patent No. 2,130,809 granted September 20, 1938. It has mounted for indexing rotation therein a turret or drum having end walls 1 and 2 which support a plurality of rotary work spindles 3 arranged in circular series about the indexing axis of the turret. Each of these work spindles 3 has a chuck 4 at its outer end inwardly of the turret end wall 2, and each spindle is tubular to receive bar or tubular stock therethrough which may be gripped by the chuck 4 of the respective spindle. The turret is indexed to bring the several work spindles successively into each tooling station as illustrated in my Patent No. 2,130,809, a portion of the indexing arm being shown at 10 in Fig. 1. This arm is carried by an overhead cam shaft 11 journaled in suitable spaced bearings 12 at the top of the machine, the machine shown being of the well known Cone type with an overhead cam shaft carrying cam drums which support cams for controlling various mechanisms of the machine.

Coaxial with the turret it has secured thereto a tubular shaft or sleeve 15, the end remote from the turret being journaled as in the upright frame member 16. Through this tubular member 15 may extend a rotary shaft 17 provided within the turret with a gear 18, which meshes with gears 19 secured to the various work spindles. Thus by rotation of the shaft 17, the spindles may each be rotated within the turret and at suitable times the turret itself may be indexed to bring the several work spindles 3 successively into the various operative stations. The tubular shaft or sleeve 15 rotates with the turret during its indexing motions, but it is at other times stationary. Slidable axially and supported thereon is a tool carrier slide 20. At one end this slide 20 is provided with an upward extension 21 forming part of a slide 22 mounted for sliding motion lengthwise of the machine and parallel to the axis of the shaft 17 in a top frame member 28 which carries the bearings 12 which support the cam shaft 11. The tool slide 22 may be moved in this manner by cams (not shown) on a cam drum 30 carried by the cam shaft 11 and engaging a cam follower roll 31 rotatably supported on the top of the slide 22.

The hollow shaft or sleeve 15 may be employed to support a plurality of work supports which may engage the various work pieces on the several spindles at some distance forwardly of their engagement in the chucks 4, thus to support them against bending forces exerted by the various tools. Such tools may, for example, be mounted on front and rear tool carriers 32 and 33 which move toward and from the center of the machine at the front and back as is the usual custom in connection with lathes of the Cone type.

For supporting these work holders, a two-part carrier sleeve 35, shown detached in Figure 3 may be employed. This carrier sleeve may have a central elongated hub portion 36 and each part may be provided with a key 37 so that when the two parts are clamped about the shaft or sleeve 15, the keys 37 may engage in the key slots 38 of the sleeve 15 (Figure 1). The members 35 may be clamped together as by screws 40 in any adjusted axial position along the sleeve 15. They are shown as provided with longitudinal T slots 41 in their peripheries to receive the work supports 43 which may be clamped in adjusted position lengthwise of these key slots. These work supports may be of various types, but a support of one type is shown best in Figure 4. It may comprise a block 44 having a curved lower face to fit the curvature of the periphery of the support 35. The block 44 may be provided with slots in which may be secured the brackets 45 which have journaled therein the work supporting rolls 46, so positioned as to receive the thrust from the various working tools as heretofore described, the work piece being shown in dotted lines at 50. The block 43 may be provided with dovetail members 51 for engagement within the T slots 41. It will be noted that each of these work supports moves with the indexing of the turret and so remains in supporting relation to the work piece in one spindle at all times regardless of the indexing of the turret.

After a work piece has been completed and cut off, as will later appear, the stock is fed through the spindle at the loading station, which is shown in Figure 2 as the top station. Suitable feeding mechanism such as is well known in the art may be employed to grip and feed the bar or tubular stock so that no further description of this appears to be necessary herein, and the work is fed against a stock stop shown at 60 in Figure 1. This stock stop is shown as supported in a bearing 61 carried by the tool carrier 20, the bearing 61 being slidable along the stock stop 60 as the tool carrier 20 is moved. At its rear end the stock stop is shown as secured as by a threaded engagement in the frame partition 16.

The carrier 20 may be utilized to support various end working tools such as drills, reamers, or the like, and it may also support side working tools which operate upon the end portions of the work pieces. Such a side tool is shown at 65, in Figure 1, being mounted in a carrier 66 and movable through a bearing 67 fixed to the tool carrier 20. This tool 65 may have positioned substantially opposite thereto to take the thrust therefrom, one or more supporting rolls 70. Each of these tools may be moved axially of its support and, if desired, independently of the motion of the tool carrier 20 which carries the bearing 67. As shown this may be accomplished by the action of a lever 71 having its lower end connected through the link 72 with a clamping block 73 secured to the rear end of the tool support 66 and operated in any suitable way by cams on an appropriate cam drum 75 carried by the cam shaft 11. See, for example, the Cone Patent No. 1,934,620 granted November 7, 1933 (Figure 25).

Other work supports for the outer end of the work may be fixed to the tool carrier 20, such a support being illustrated at 78. Roller supports of this type will, of course, have to be removed from the ends of the work by the retraction of the tool carrier 20 for indexing motions of the work pieces since the carrier 20 is not indexed.

Where long work is being operated upon as illustrated herein, the overhanging portion of the work must be supported spaced from the chuck during the time that the turned blank or article is cut from the stock within the spindle. For this reason a supporting unloading device has been illustrated in Figures 5 to 8, inclusive. This device is arranged to receive and support the work at station 8 just previous to the loading station as viewed in Figure 2. It comprises a tubular member 80 having a mouth portion 81 at its forward end (see Figure 7) within which the forward end of the work piece 50 may extend, and this tubular member 80 is slidably mounted within a cylinder 82, which is mounted in fixed position so that the tube 80 may be moved toward the turret and telescopically receive the outer end of the work piece 50 therein and support it while it is being cut off by the cutting off tool 83 (see Figure 2). A plurality of spring fingers 85 within the mouth portion 81 and inclined inwardly and backwardly may frictionally engage the outer face of the work piece 50, tending to center it during the cutting off operation and also acting to prevent reverse direction motion of the work therein.

As shown best in Figures 7 and 8, the cylinder 82 is of larger internal diameter than the external diameter of the tube 80, and at a suitable point along the tube 80, it has secured thereto a piston head 87 having the packing rings 88 secured in position by the clamping rings 89 and 90 secured together by the bolts and nuts 91. The cylinder 82 is supported in fixed position as by the clamp collar 92. The tube 80 extends completely through the cylinder 82 through packed heads, one of which is shown at 84 in Figure 7 and may be driven axially by fluid pressure introduced on one or the other side of the piston head 87 as through one or the other of the valve controlled pipes 93 and 94. As it is moved toward the turret and receives a work piece therein, work pieces which have already been loaded therein are pushed rearwardly by the entering work piece, so that they are ultimately discharged through the rear end of the tube 80 which may extend through the end of the machine and deliver the work pieces into any suitable conveyor (not shown) or other means by which they may be removed from the machine.

From the foregoing description of an embodiment of this invention, it will be seen that the work even though of extreme length relative to its diameter is adequately supported, both by supports which can take the thrust of the tools and which are indexed with the turret, and supports which come opposite to tools which work on the extreme end portions of the work and which are individual to the several tools and not indexed with the work, and that when the work is being cut off from the stock, it is also supported against the thrust of the tool and is removed from the machine while adequately protected against distortion.

It will be evident to those skilled in the art, also, that various modifications and changes might be made without departing from the spirit or scope of this invention as defined by the appended claims.

I claim:

1. The combination with a turret, and a plurality of tubular work spindles journaled in said turret, of a carrier movable with said turret, and having ways extending parallel to the axis of said turret, means for indexing said turret, a plurality of work supports, means for securing said work supports in said ways in desired positions therealong, and means for feeding work through said spindles into supported relation to said work supports.

2. The combination with an indexing turret having an axial extension, a non-indexing tool slide movable axially on said extension, and a plurality of rotary spindles in said turret arranged in circular array about the axis thereof, of a stock stop carried by said tool slide opposite to one of the stations of said spindles, tools on said tool slide for operating on work at certain of said stations, and work supports carried by said extension between ends of said spindles and said tool slide for supporting work against the thrust of certain of said tools.

3. The combination with a movable carrier, a plurality of tubular work spindles supported by said carrier, and means for indexing said carrier, of a work support for supporting work carried by certain of said spindles remote from said spindles, means insuring indexing movement of said work supports with said carrier to thereby maintain said work supports in supporting relation to the work during indexing of said carrier, and means for feeding work through said spindles into supported relation to said work supports.

4. The combination in a multiple spindle machine having an indexing carrier, a plurality of work spindles arranged in circular array about the axis of said carrier, a sleeve secured coaxially to said carrier for indexing motion therewith, and a tool support in which said sleeve is journaled and movable axially thereof, of a work support carrier secured on said sleeve, work supports on said carrier for supporting work projecting from said spindles, said work supports maintaining their relation to their respective work during the indexing of said carrier, work supports on said tool carrier for certain indexed stations and relative to which the work is indexed, and means for moving said tool support to bring the work holders carried thereby into and out of work-supporting relation between indexing motions of said carrier.

5. In a multiple spindle machine, an indexing spindle carrier, work spindles carried by said carrier and movable by the indexing of said carrier successively to an unloading station, means at said unloading station movable axially of the spindle at said station for engagement with the free end portion of the work piece and supporting it as it is unloading, and having means for conducting said unloaded piece out of the machine.

6. In a multiple spindle machine, an indexing spindle carrier, tubular stock-holding work spindles carried by said carrier and movable by the indexing of said carrier successively to an unloading station, a tubular member in axial alinement with the spindle at said unloading station and having an internal diameter such that it may telescope the work extending from said spindle, means at said unloading station to sever the work from the stock in said spindle, and means for reciprocating said tubular member to receive the work therein and support it during the severing operation and then to retract the severed work piece.

7. In a multiple spindle machine, an indexing spindle carrier, tubular stock-holding work spindles carried by said carrier and movable by the indexing of said carrier successively to an unloading station, a tubular member in axial alinement with the spindle at said unloading station and having an internal diameter such that it may telescope the work extending from said spindle, means at said unloading station to sever the work from the stock in said spindle, and means for reciprocating said tubular member to receive the work therein and support it during the severing operation and then to retract the severed work piece, said tubular member having work-engaging means opposing backward motion of a work piece therein.

8. In a multiple spindle machine, an indexing spindle carrier, tubular stock-holding work spindles carried by said carrier and movable by the indexing of said carrier successively to an unloading station, a tubular member in axial alinement with the spindle at said unloading station and having an internal diameter such that it may telescope the work extending from said spindle, means at said unloading station to sever the work from the stock in said spindle, and means for reciprocating said tubular member to receive the work therein and support it during the severing operation and then to retract the severed work piece, and work-engaging spring fingers supported adjacent to the work-entering end of such tubular member and inclined backwardly and inwardly to oppose reverse direction motion of the work while permitting forward motion thereof relative to said tubular member.

CARROLL E. MILLER.